United States Patent
Piccard et al.

(10) Patent No.: US 11,518,160 B2
(45) Date of Patent: Dec. 6, 2022

(54) METHOD FOR NON-CONTACT ADHESIVE ACTIVATION AND WRAPPING OF A DECORATIVE SKIN TO A PART HAVING CURVED SURFACES AND A PART FORMED BY THE METHOD

(71) Applicant: INTEVA PRODUCTS, LLC, Troy, MI (US)

(72) Inventors: Robert Piccard, Ray, MI (US); Gabriel Rapetti, Rochester Hills, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 482 days.

(21) Appl. No.: 16/555,399

(22) Filed: Aug. 29, 2019

(65) Prior Publication Data
US 2021/0060919 A1 Mar. 4, 2021

(51) Int. Cl.
B32B 37/06 (2006.01)
B32B 3/04 (2006.01)
(Continued)

(52) U.S. Cl.
CPC ............ *B32B 37/1207* (2013.01); *B32B 3/04* (2013.01); *B32B 7/12* (2013.01); *B32B 37/0046* (2013.01);
(Continued)

(58) Field of Classification Search
CPC .......... B32B 2605/033; B32B 2451/06; B32B 37/0046; B32B 37/06; B32B 3/04; B60R 13/02; Y10T 428/2419
(Continued)

(56) References Cited

U.S. PATENT DOCUMENTS 5,324,384 A * 6/1994 Spengler ................. B29C 63/04
156/227
5,437,753 A * 8/1995 Ugolini ............. B29C 66/81871
156/251
(Continued)

*Primary Examiner* — Scott W Dodds
(74) *Attorney, Agent, or Firm* — Cantor Colburn LLP

(57) ABSTRACT

A method for non-contact adhesive activation and securement of a decorative skin to a part, including: applying an adhesive to a top surface of the part; applying the decorative skin to the adhesive after it have been applied to the top surface of the part; locating an upper heating element or elements of an upper heating plate or platen adjacent to the top surface of the part; locating a lower heating element or elements of a lower heating plate or platen adjacent to a bottom surface of the part, the bottom surface of the part being opposite to the top surface of the part; activating an adhesive located on the top surface of the part via the upper heating element or elements of the upper heating plate or platen and the lower heating element or elements of the lower heating plate or platen when the upper heating element or elements and the lower heating element or elements are adjacent to the part, wherein the upper heating plate or platen and the lower heating plate or platen do not contact the part and the decorative skin; heating the decorative skin during the activating step without contacting the decorative skin with the upper heating plate or platen and the lower heating plate or platen; moving the upper heating plate or platen and the lower heating plate or platen away from the part after the activating step; and applying pressure to the decorative skin located on the top surface as well as the portion of the bottom surface of the part via an upper plate and a lower plate, wherein portions of the part on the top surface have a curved surface that is covered by the decorative skin, the curved surface being defined by a radius of curvature that is less greater than 0 and less than 25 mm.

12 Claims, 3 Drawing Sheets

(51) Int. Cl.
  *B32B 37/12*   (2006.01)
  *B32B 7/12*    (2006.01)
  *B32B 37/00*   (2006.01)
  *B60R 13/02*   (2006.01)
(52) U.S. Cl.
  CPC .............. *B32B 37/06* (2013.01); *B60R 13/02* (2013.01); *B32B 2605/003* (2013.01); *Y10T 428/2419* (2015.01)
(58) Field of Classification Search
  USPC .................................................. 428/121, 122
  See application file for complete search history.

(56) References Cited

U.S. PATENT DOCUMENTS

| | | | | |
|---|---|---|---|---|
| 5,718,791 | A * | 2/1998 | Spengler | B29C 63/025 |
| | | | | 156/212 |
| 10,076,856 | B2 * | 9/2018 | Hayes | B29C 51/267 |
| 10,286,639 | B2 * | 5/2019 | Maas | B29C 63/0034 |
| 10,336,011 | B2 * | 7/2019 | Bieder | B42B 4/00 |
| 10,773,463 | B2 * | 9/2020 | Hammer | B32B 15/046 |
| 11,207,819 | B2 * | 12/2021 | Schimmelpfennig | ........ |
| | | | | B29C 51/082 |
| 2003/0030188 | A1 * | 2/2003 | Spengler | B29C 51/14 |
| | | | | 264/102 |
| 2011/0108667 | A1 * | 5/2011 | Keller | B29C 51/082 |
| | | | | 244/119 |

* cited by examiner

METHOD FOR NON-CONTACT ADHESIVE ACTIVATION AND WRAPPING OF A DECORATIVE SKIN TO A PART HAVING CURVED SURFACES AND A PART FORMED BY THE METHOD

BACKGROUND

Exemplary embodiments of the present disclosure pertain to the art of securement of a decorative skin to substrate.

In order to secure a decorative skin to a substrate or component an adhesive is used. Current techniques involve long cycle times, inconsistent heat across a platen or table and multiple parts. Also the inconsistent or too much heat on the decorative skin may cause damage to the decorative skin which drives up scrap rates while too little heat will result in delamination of the skin and adds to unnecessary warranty claims. Accordingly, it is desirable to provide an improved method for securement of the decorative skin to the substrate.

BRIEF DESCRIPTION

Disclosed is a method for non-contact adhesive activation and securement of a decorative skin to a part. The method including the steps of: applying an adhesive to a top surface of the part; applying the decorative skin to the adhesive after the adhesive has been applied to the top surface of the part; locating an upper heating element or elements of an upper heating plate or platen adjacent to the top surface of the part; locating a lower heating element or elements of a lower heating plate or platen adjacent to a bottom surface of the part, the bottom surface of the part being opposite to the top surface of the part; activating the adhesive located on the top surface of the part via the upper heating element or elements of the upper heating plate or platen and the lower heating element or elements of the lower heating plate or platen when the upper heating element or elements and the lower heating element or elements are adjacent to the part, wherein the upper heating plate or platen and the lower heating plate or platen do not contact the part and the decorative skin; heating the decorative skin during the activating step without contacting the decorative skin with the upper heating plate or platen and the lower heating plate or platen; moving the upper heating plate or platen and the lower heating plate or platen away from the part after the activating step; and applying pressure to the decorative skin located on the top surface as well as a portion of the decorative skin located on the bottom surface of the part via an upper plate and a lower plate, wherein at least one portion of the part on the top surface have a curved surface that is covered by the decorative skin, the curved surface being defined by a radius of curvature that is greater than 0 and less than 25 mm.

In addition to one or more of the features described above, or as an alternative to any of the foregoing embodiments, movement of the upper heating plate or platen and the lower heating plate or platen is performed by an actuator operably coupled to the upper heating plate or platen and the lower heating plate or platen.

In addition to one or more of the features described above, or as an alternative to any of the foregoing embodiments, the actuator is controlled by a controller.

In addition to one or more of the features described above, or as an alternative to any of the foregoing embodiments, movement of the upper heating plate or platen and the lower heating plate or platen is performed by an actuator operably coupled to the upper heating plate or platen and the lower heating plate or platen.

In addition to one or more of the features described above, or as an alternative to any of the foregoing embodiments, the upper plate and/or the lower plate have complimentary curved surfaces for applying pressure to the curved surface.

In addition to one or more of the features described above, or as an alternative to any of the foregoing embodiments, the heating elements of the upper heating plate or platen and the lower heating plate or platen are provided in sections that are controlled by a controller.

In addition to one or more of the features described above, or as an alternative to any of the foregoing embodiments, the pressure applied to the decorative skin located on the top surface as well as the portion of the decorative skin located on the bottom surface is applied via pneumatic or hydraulic cylinders to conjoin the part with the decorative skin.

In addition to one or more of the features described above, or as an alternative to any of the foregoing embodiments, the pressure is applied via application of a vacuum to the decorative skin and the part.

In addition to one or more of the features described above, or as an alternative to any of the foregoing embodiments, the heating elements of the upper heating plate or platen and/or the lower heating plate or platen are configured to follow a perimeter of the part.

In addition to one or more of the features described above, or as an alternative to any of the foregoing embodiments, the heating elements of the upper heating plate or platen and the lower heating plate or platen are provided in sections that are controlled a controller.

In addition to one or more of the features described above, or as an alternative to any of the foregoing embodiments, the radius of curvature is greater than 0 and less than 20 mm.

In addition to one or more of the features described above, or as an alternative to any of the foregoing embodiments, the upper plate and/or the lower plate have complimentary curved surfaces for applying pressure to the curved surface.

In addition to one or more of the features described above, or as an alternative to any of the foregoing embodiments, a vehicle interior trim piece formed by the method.

Also disclosed is a vehicle interior trim piece, the vehicle interior trim piece including: a part having a top surface and a bottom surface of the part, the bottom surface of the part being opposite to the top surface of the part; a decorative skin secured to the top surface via an adhesive located on the top surface, wherein portions of the top surface of the part have a curved surface that is covered by the decorative skin, the curved surface being defined by a radius of curvature that is less greater than 0 and less than 25 mm.

In addition to one or more of the features described above, or as an alternative to any of the foregoing embodiments, the radius of curvature that is less greater than 0 and less than 20 mm.

In addition to one or more of the features described above, or as an alternative to any of the foregoing embodiments, the decorative skin is wrapped about a portion of the bottom surface of the part and the decorative skin is secured to the portion of the bottom surface via an adhesive.

Also disclosed is a method for non-contact adhesive activation and securement of a decorative skin to a part, the method including the steps of: locating an upper heating element or elements of an upper heating plate or platen adjacent to a top surface of the part; locating a lower heating element or elements of a lower heating plate or platen adjacent to a bottom surface of the part, the bottom surface of the part being opposite to the top surface of the part; activating an adhesive located on the top surface of the part via the upper heating element or elements of the upper heating plate or platen and the lower heating element or elements of the lower heating plate or platen when the upper heating element or elements and the lower heating element or elements are adjacent to the part, wherein the upper heating plate or platen and the lower heating plate or platen do not contact the part; moving the upper heating plate or platen and the lower heating plate or platen away from the part after the activating step; applying a decorative skin to the top surface of the part via an upper plate; wrapping the decorative skin about a portion of the bottom surface of the part; and applying pressure to the decorative skin located on the top surface as well as the portion of the bottom surface of the part via the upper plate and a lower plate, wherein portions of the part on the top surface have a curved surface that is covered by the decorative skin, the curved surface being defined by a radius of curvature that is less greater than 0 and less than 25 mm.

In addition to one or more of the features described above, or as an alternative to any of the foregoing embodiments, movement of the upper heating plate or platen and the lower heating plate or platen is performed by an actuator operably coupled to the upper heating plate or platen and the lower heating plate or platen.

In addition to one or more of the features described above, or as an alternative to any of the foregoing embodiments, the actuator is controlled by a controller.

In addition to one or more of the features described above, or as an alternative to any of the foregoing embodiments, movement of the upper heating plate or platen and the lower heating plate or platen is performed by an actuator operably coupled to the upper heating plate or platen and the lower heating plate or platen.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
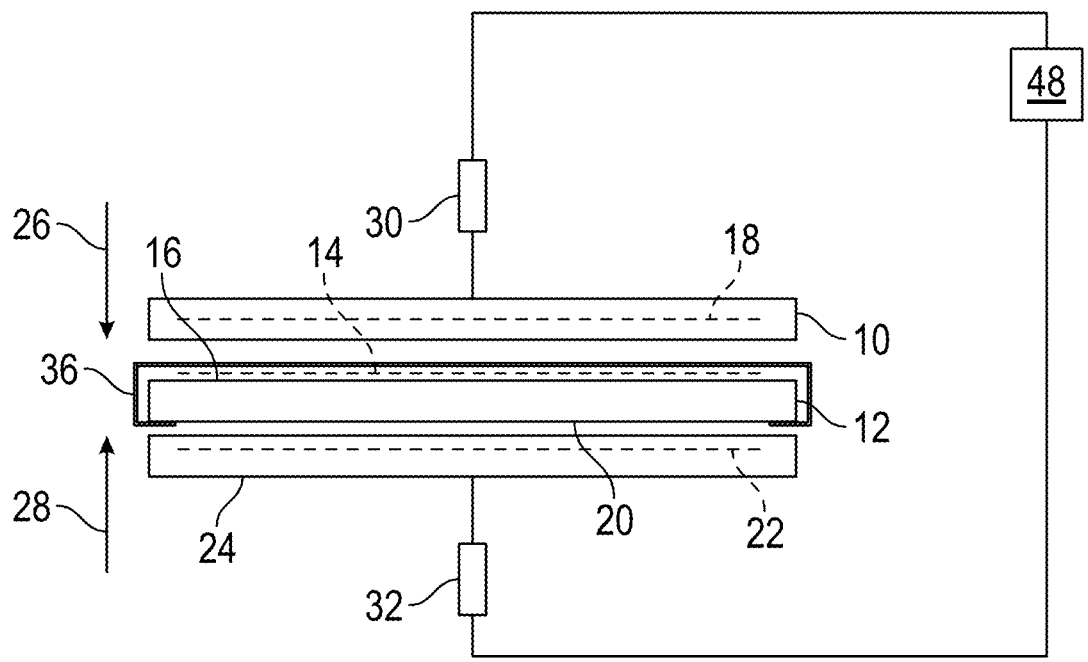
FIGS. 1 and 2 are schematic illustrations of the present method for non-contact adhesive activation and securement of a decorative skin to a part.
Figure 2:
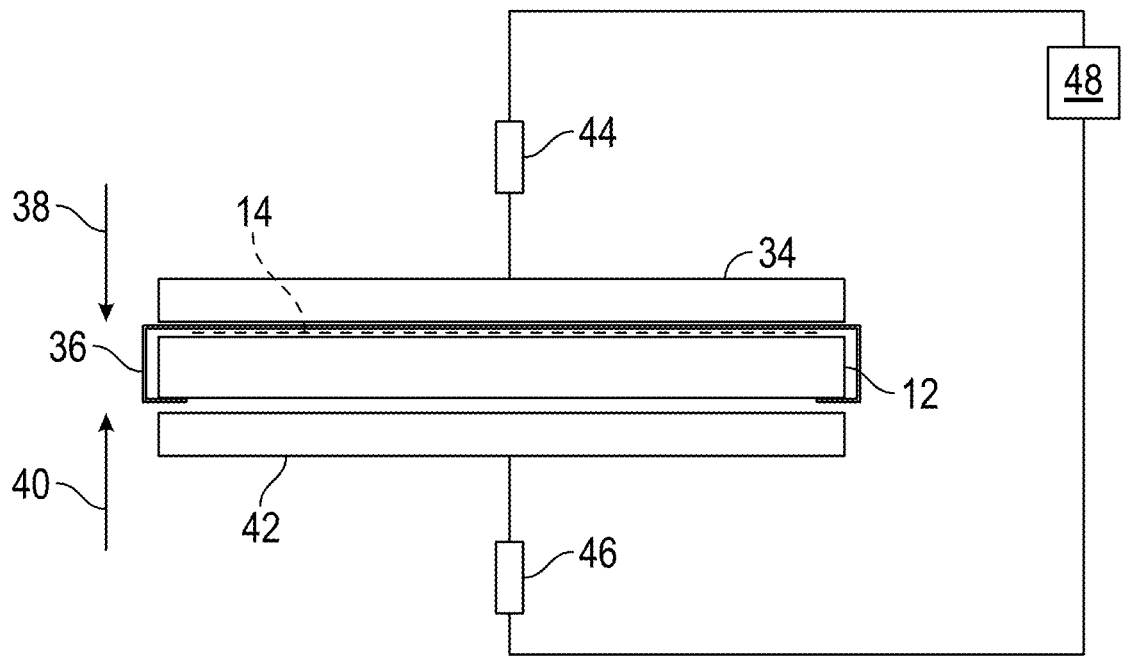

Referring now to FIGS. 1 and 2, schematic illustrations of the present method for non-contact adhesive activation and securement of a decorative skin to a part are provided.

During a first step an upper heating plate or platen 10 is located adjacent to substrate or part 12 that is has an adhesive or glue 14 located on its top surface 16. In addition, a decorative skin 36 is wrapped over the substrate or part 12 after the application of the adhesive or glue and is located over the adhesive or glue 14. The decorative skin 36 can be pre-wrapped or tacked in place over the substrate or part 12 prior to the locating of the upper heating plate or platen 10 adjacent to substrate or part 12. The upper heating plate or platen 10 is provided with a plurality of heating elements 18 that when activated provide a source of heat to activate the adhesive 14 and warm up the decorative skin 36. It should be understood that in accordance with the present disclosure the upper heating plate or platen 10 does not come into contact with the decorative skin 36, adhesive or glue 14 and/or the substrate or part 12. However, the upper heating plate or platen 10 is close enough to activate the adhesive or glue 14 via an applied source of heat as well as warming of the decorative skin 36.

In one embodiment, the decorative skin is anyone of a thermoplastic olefin (TPO), leather, vinyl, cloth, or equivalents thereof and the substrate or part 12 is formed from a plastic material or thermoplastic material or equivalents thereof.

At the same time the top surface 16 is being heated, a bottom surface 20 around the perimeter of the substrate or part 12 is also being heated by a lower heating element or elements 22 of a lower heating plate or platen 24. In one embodiment, the heating element or elements 22 will follow a perimeter of the part or the substrate 12 for all edge wrap locations.

During a second step and once the adhesive or glue 14 is heated to a suitable temperature, the upper heating plate or platen 10 and the lower heating plate or platen 24 are moved away from the part or substrate 12 in a direction opposite to arrows 26 and 28 by an actuator 30 operably coupled to the upper heating plate or platen 10 and an actuator 32 operably coupled to the lower heating plate or platen 24. It being understood that actuators 30 and 32 may operate to move the upper heating plate or platen 10 and the lower heating plate or platen 24 in the direction of arrows 26 and 28 when a new part or substrate 12 is ready to have its adhesive 14 heated and activated.

Also, the heating elements 18 and 22 of the upper heating plate or platen 10 and the lower heating plate or platen 24 may be broken up into sections and controlled by 'zones' to direct more or less heat as needed in any certain location.

Referring now to FIG. 2 and during a third step and when the adhesive or glue 14 is heated to a suitable temperature and the upper heating plate or platen 10 and the lower heating plate or platen 24 are moved away from the part or substrate 12, a new upper platen or plate 34 will then brought into contact with the decorative skin 36 to secure the decorative skin 36 to the part 12. During this step the skin 36 may be suctioned to a bladder membrane.

During a next or fourth step, pressure is applied in the direction of arrow 38 to mate the decorative skin 36 to the substrate in the form of vacuum or hard tooling with pneumatic or hydraulic cylinders to conjoin the parts together. Pressure is also applied to the B side or bottom surface 20 of the part or substrate 12 in the direction of arrow 40 via a lower platen or plate 42. Depending upon the configuration of the part or substrate 12, edge wrapping of the decorative skin 36 may be possible before application of the platens or plates 34 and 42 or is completed by the application of the platens or plates 34 and 42.

Through the use of applied pressure to the wrapped edges there is no longer a need to use staples or other equivalent fasteners to secure the edges of the decorative skin 36 to the bottom surface 20 of the part or substrate 12.

At a final step or fifth step, the platens or plates 34 and 42 are moved away from the part or substrate 12 in directions opposite to arrows 38 and 40 via an actuator 44 operably coupled to the upper plate or platen 34 and an actuator 46 operably coupled to the lower platen or plate 42. The part or substrate 12 with the decorative skin 36 adhered thereto would be presented to an operator of an apparatus or controller 48 that controls the platens or plates 10, 24, 34 and 42. The controller 48 controls the platens or plates 10, 24, 34 and 42 to provide the following functions, which include but are not limited to the following: movement of the platens or plates via operation of actuators 30, 32, 44 and 46; application of the aforementioned heat via heating elements 18 and 22 as well as individual control of the heating elements 18 and 22 to apply localized heating; and application of pressure or vacuum via hard tooling via operation of the actuators 44 and 46. In one embodiment, the actuators 30, 32, 44 and 46 are pneumatic or hydraulic cylinders that are operated by apparatus or controller 48. In an embodiment, the controller 48 may include memory to store instructions that are executed by one or more processors. The executable instructions may be stored or organized in any manner and at any level of abstraction, such as in connection with a controlling and/or monitoring operation of the platens or plates 10, 24, 34 and 42 including but not limited to the movement of the platens or plates via operation of actuators 30, 32, 44 and 46, application of the aforementioned heat via heating elements 18 and 22 as well as individual control of the heating elements 18 and 22 to apply localized heating and application of pressure or vacuum via hard tooling via operation of the actuators 44 and 46. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In one embodiment, the part or substrate 12 with the decorative skin 36 adhered thereto may be an interior component or interior trim piece of a vehicle such as a portion of an instrument panel or console wherein the decorative skin 36 is the class A show surface of the vehicle interior.

Figure 3:
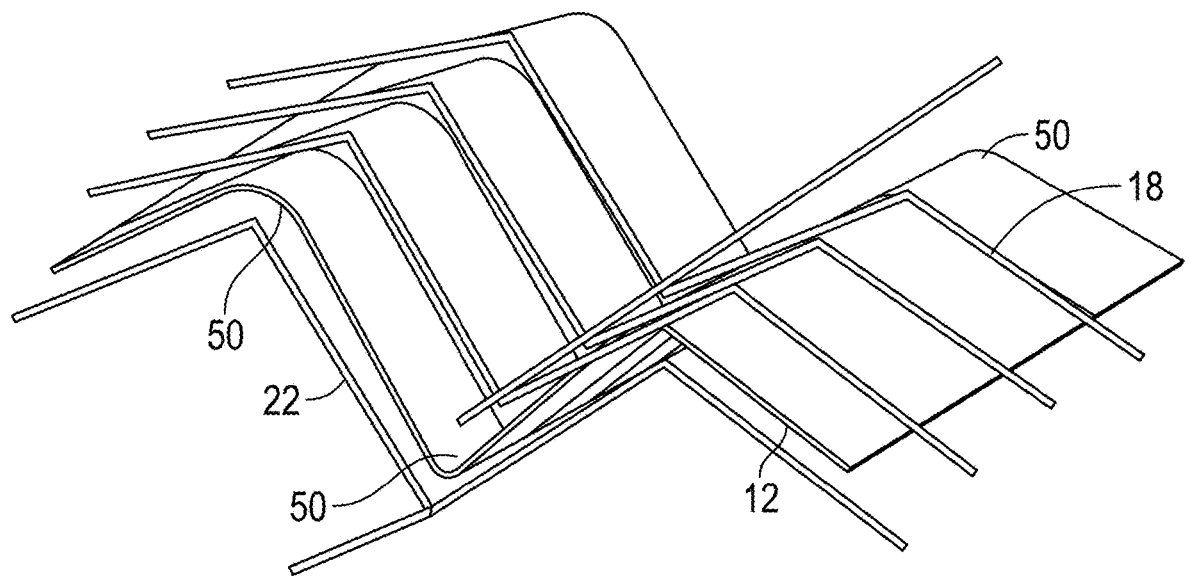
FIGS. 3 and 4 are illustrations of the present method for non-contact adhesive activation and securement of a decorative skin to a part having curved surfaces.
Figure 4:
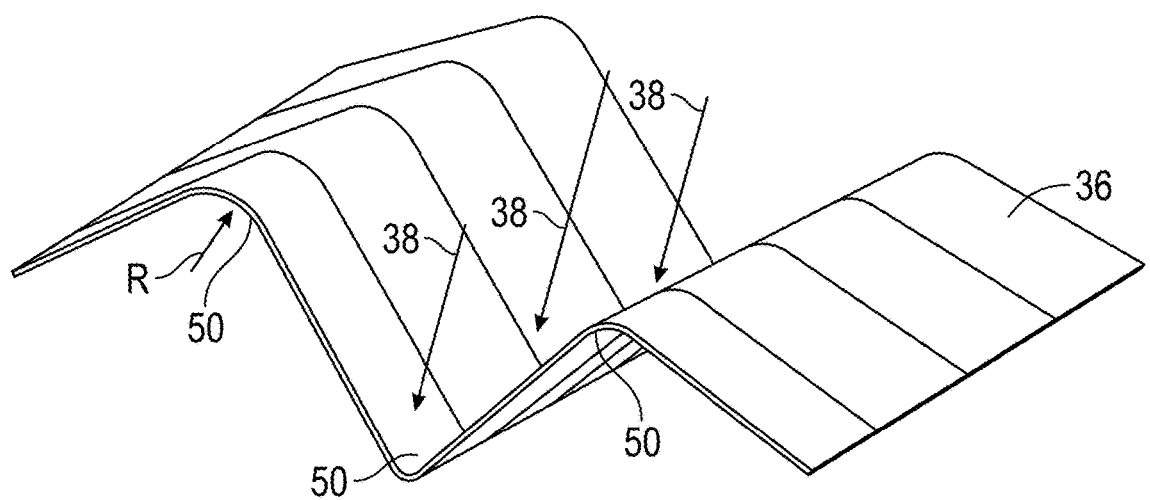

Referring now to FIGS. 3 and 4, curves of the upper heating plate or platen 10, the lower heating plate or platen 24 and the substrate or part 12 are illustrated. In FIG. 3 and for ease of review only the heating elements 18 and 20 are illustrated. In other words, the upper heating plate or platen 10 and the lower heating plate or platen 24 are not illustrated.

FIG. 4 illustrates the aforementioned third step when the adhesive or glue 14 is heated to a suitable temperature and the upper heating plate or platen 10 and the lower heating plate or platen 24 are moved away from the part or substrate 12, and the new upper platen or plate 34 is brought into contact with the decorative skin 36. Here pressure is applied in the direction of arrows 38 to meet the decorative skin 36 to the substrate in the form of vacuum or hard tooling with pneumatic or hydraulic cylinders to conjoin the parts together.

FIGS. 3 and 4 illustrate heating elements 18 and 22 that apply heat directly to the sharp radii areas 50 of the substrate or part 12. In one non-limiting embodiment, the sharp radii areas have a radius of curvature R that is no greater than 25 mms. In yet another embodiment, the radius of curvature R of the sharp radii areas is no greater than 20 mms.

Through the use of non-contact hot plate technology, a non-contact surface is provided to heat the part or substrate with better control and uniformity, while having better control of temperature at edges, in deep draw areas, and in critical areas of the B side or back side 20 of the part or substrate 12.

Thereafter, direct pressure into the tight radii 50 of the part or substrate 12 is applied by directed hard tooling after the adhesive 14 is activated by the heat of plates or platens 10 and 24.

As such, a non-contact heating source can be used to direct the heat in a more uniform manner. Then, the heating source is moved away from the part to bring in a part specific membrane that applies the pressure for chemical bonding of the adhesive 14 under the A surface of the decorative skin 36. Therefore, an improved bonding of the decorative skin 36 to the substrate 12 through activation of the adhesive 14 to create a better method of securement than is available with current technologies.

Figure 5:
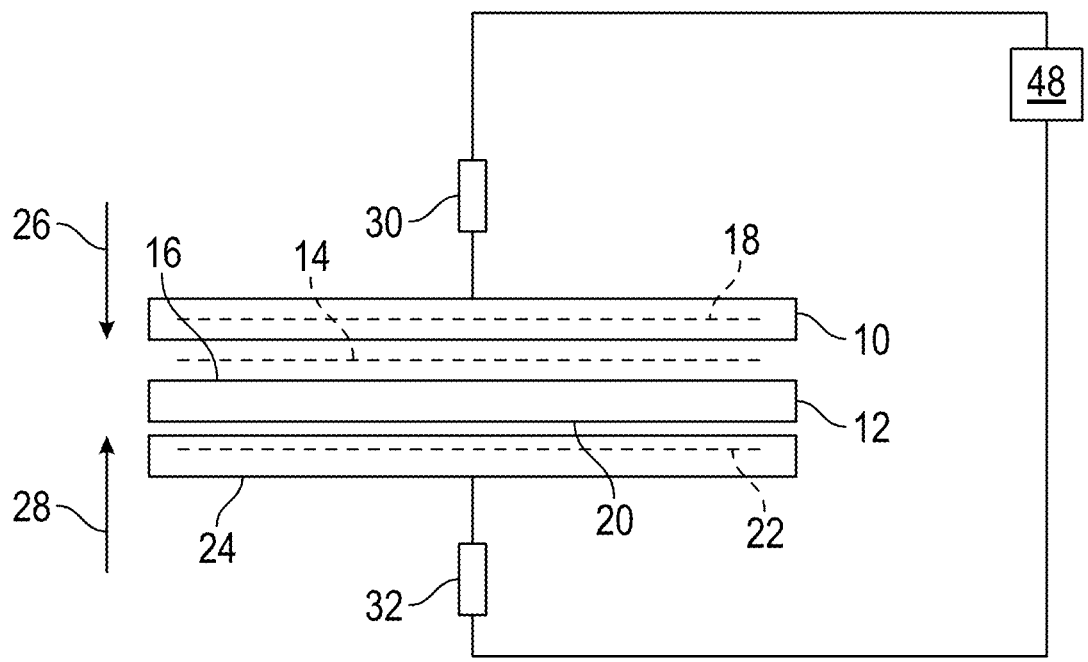
FIGS. 5 and 6 are schematic illustrations of an alternative method for non-contact adhesive activation and securement of a decorative skin to a part.
Figure 6:
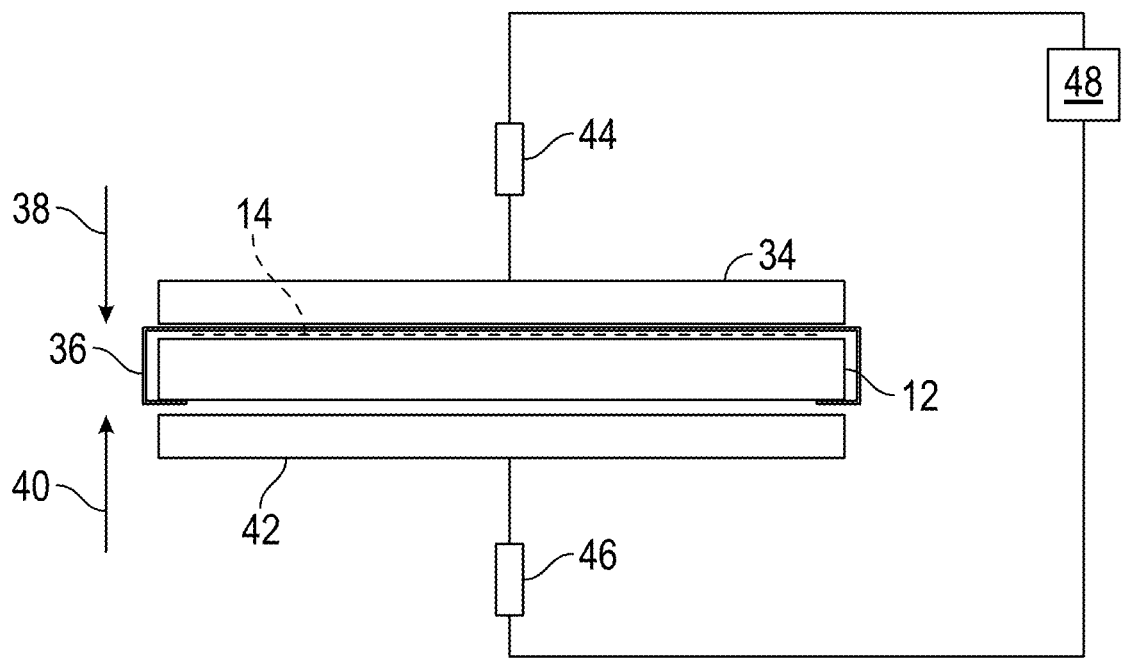

In an alternative embodiment, and as illustrated in FIGS. 5 and 6 schematic illustrations of another method for non-contact adhesive activation and securement of a decorative skin to a part are provided. In this embodiment, the decorative skin 36 is applied after the adhesive or glue 14 has been heated by the platen 10.

During a first step an upper heating plate or platen 10 is located adjacent to substrate or part 12 that is has an adhesive or glue 14 located on its top surface 16. The upper heating plate or platen 10 is provided with a plurality of heating elements 18 that when activated provide a source of heat to activate the adhesive 14. It should be understood that in accordance with the present disclosure the upper heating plate or platen 10 does not come into contact with the adhesive or glue 14 and/or the substrate or part 12. However, the upper heating plate or platen 10 is close enough to activate the adhesive or glue 14 via an applied source of heat.

At the same time the top surface 16 is being heated, a bottom surface 20 around the perimeter of the substrate or part 12 is also being heated by a lower heating element or elements 22 of a lower heating plate or platen 24. In one embodiment, the heating element or elements 22 will follow a perimeter of the part or the substrate 12 for all edge wrap locations.

During a second step and once the adhesive or glue 14 is heated to a suitable temperature, the upper heating plate or platen 10 and the lower heating plate or platen 24 are moved away from the part or substrate 12 in a direction opposite to arrows 26 and 28 by an actuator 30 operably coupled to the upper heating plate or platen 10 and an actuator 32 operably coupled to the lower heating plate or platen 24. It being understood that actuators 30 and 32 may operate to move the upper heating plate or platen 10 and the lower heating plate or platen 24 in the direction of arrows 26 and 28 when a new part or substrate 12 is ready to have its adhesive 14 heated and activated.

Also, the heating elements 18 and 22 of the upper heating plate or platen 10 and the lower heating plate or platen 24 may be broken up into sections and controlled by 'zones' to direct more or less heat as needed in any certain location.

Referring now to FIG. 6 and during a third step and when the adhesive or glue 14 is heated to a suitable temperature and the upper heating plate or platen 10 and the lower heating plate or platen 24 are moved away from the part or substrate 12, a new upper platen or plate 34 will then bring in the decorative skin 36 to secure the decorative skin 36 to the part 12. During this step the skin 36 may be suctioned to a bladder membrane.

During a next or fourth step, pressure is applied in the direction of arrow 38 to mate the decorative skin 36 to the substrate in the form of vacuum or hard tooling with pneumatic or hydraulic cylinders to conjoin the parts together. Pressure is also applied to the B side or bottom surface 20 of the part or substrate 12 in the direction of arrow 40 via a lower platen or plate 42. Depending upon the configuration of the part or substrate 12, edge wrapping of the decorative skin 36 may be possible before application of the platens or plates 34 and 42 or is completed by the application of the platens or plates 34 and 42.

Through the use of applied pressure to the wrapped edges there is no longer a need to use staples or other equivalent fasteners to secure the edges of the decorative skin 36 to the bottom surface 20 of the part or substrate 12.

At a final step or fifth step, the platens or plates 34 and 42 are moved away from the part or substrate 12 in directions opposite to arrows 38 and 40 via an actuator 44 operably coupled to the upper plate or platen 34 and an actuator 46 operably coupled to the lower platen or plate 42. The part or substrate 12 with the decorative skin 36 adhered thereto would be presented to an operator of an apparatus or controller 48 that controls the platens or plates 10, 24, 34 and 42. The controller 48 controls the platens or plates 10, 24, 34 and 42 to provide the following functions, which include but are not limited to the following: movement of the platens or plates via operation of actuators 30, 32, 44 and 46; application of the aforementioned heat via heating elements 18 and 22 as well as individual control of the heating elements 18 and 22 to apply localized heating; and application of pressure or vacuum via hard tooling via operation of the actuators 44 and 46. In one embodiment, the actuators 30, 32, 44 and 46 are pneumatic or hydraulic cylinders that are operated by apparatus or controller 48. In an embodiment, the controller 48 may include memory to store instructions that are executed by one or more processors. The executable instructions may be stored or organized in any manner and at any level of abstraction, such as in connection with a controlling and/or monitoring operation of the platens or plates 10, 24, 34 and 42 including but not limited to the movement of the platens or plates via operation of actuators 30, 32, 44 and 46, application of the aforementioned heat via heating elements 18 and 22 as well as individual control of the heating elements 18 and 22 to apply localized heating and application of pressure or vacuum via hard tooling via operation of the actuators 44 and 46. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

As mentioned above, the part or substrate 12 with the decorative skin 36 adhered thereto may be an interior component or interior trim piece of a vehicle such as a portion of an instrument panel or console wherein the decorative skin 36 is the class A show surface of the vehicle interior.

It is also understood that the upper heating plate or platen 10 and the lower heating plate or platen 24 may be used with the method of FIGS. 5 and 6 where the decorative skin 36 is applied after the adhesive 14 is heated.

As mentioned previously, FIGS. 3 and 4 illustrate heating elements 18 and 22 that apply heat directly to the sharp radii areas 50 of the substrate or part 12. In one non-limiting embodiment, the sharp radii areas have a radius of curvature R that is no greater than 25 mms. In yet another embodiment, the radius of curvature R of the sharp radii areas is no greater than 20 mms.

Through the use of non-contact hot plate technology, a non-contact surface is provided to heat the part or substrate with better control and uniformity, while having better control of temperature at edges, in deep draw areas, and in critical areas of the B side or back side 20 of the part or substrate 12.

Thereafter, direct pressure into the tight radii 50 of the part or substrate 12 is applied by directed hard tooling after the adhesive 14 is activated by the heat of plates or platens 10 and 24.

As such, a non-contact heating source can be used to direct the heat in a more uniform manner. Then, the heating source is moved away from the part to bring in a part specific membrane or decorative skin 36 that applies the pressure for chemical bonding of the adhesive 14 under the A surface of the decorative skin 36. Therefore, an improved bonding of the decorative skin 36 to the substrate 12 through activation of the adhesive 14 creates a better method of securement than is available with current technologies.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for non-contact adhesive activation and securement of a decorative skin to a part, comprising:
applying an adhesive to a top surface of the part;
applying the decorative skin to the adhesive after the adhesive has been applied to the top surface of the part, wherein during the applying step the decorative skin is wrapped around an edge of the part such that the decorative skin extends from the top surface to a bottom surface of the part, the bottom surface of the part being opposite to the top surface of the part;

locating an upper heating element or elements of an upper heating plate or platen adjacent to the top surface of the part;

locating a lower heating element or elements of a lower heating plate or platen adjacent to the bottom surface of the part;

activating the adhesive located on the top surface of the part via the upper heating element or elements of the upper heating plate or platen and the lower heating element or elements of the lower heating plate or platen when the upper heating element or elements and the lower heating element or elements are adjacent to the part, wherein the upper heating plate or platen and the lower heating plate or platen do not contact the part and the decorative skin;

heating the decorative skin during the activating step without contacting the decorative skin with either one of the upper heating plate or platen and or the lower heating plate or platen;

moving the upper heating plate or platen and the lower heating plate or platen away from the part after the activating step; and applying pressure to the decorative skin located on the top surface as well as a portion of the decorative skin located on the bottom surface of the part via an upper plate and a lower plate, wherein at least one portion of the part on the top surface has a curved surface that is covered by the decorative skin, the curved surface being defined by a radius of curvature that is greater than 0 and less than 25 mm.

2. The method as in claim 1, wherein movement of the upper heating plate or platen and the lower heating plate or platen is performed by an actuator operably coupled to the upper heating plate or platen and the lower heating plate or platen.

3. The method as in claim 2, wherein the actuator is controlled by a controller.

4. The method as in claim 1, wherein the upper plate and/or the lower plate have complimentary curved surfaces for applying pressure to the curved surface.

5. The method as in claim 1, wherein the heating elements of the upper heating plate or platen and the lower heating plate or platen are provided in sections that are controlled by a controller.

6. The method as in claim 1, wherein the pressure applied to the decorative skin located on the top surface as well as the portion of decorative skin located on the bottom surface is applied via pneumatic or hydraulic cylinders to conjoin the part with the decorative skin.

7. The method as in claim 1, wherein the pressure is applied via application of a vacuum to the decorative skin and the part.

8. The method as in claim 1, wherein the heating elements of the upper heating plate or platen and/or the lower heating plate or platen are configured to follow a perimeter of the part.

9. The method as in claim 8, wherein the heating elements of the upper heating plate or platen and the lower heating plate or platen are provided in sections that are controlled a controller.

10. The method as in claim 1, wherein the radius of curvature is greater than 0 and less than 20 mm and the decorative skin is a thermoplastic olefin or leather.

11. The method as in claim 10, wherein the upper plate and/or the lower plate have complimentary curved surfaces for applying pressure to the curved surface.

12. The method as in claim 1, wherein the decorative skin is selected from the group consisting of: a thermoplastic olefin, leather, vinyl and cloth.

* * * * *